United States Patent [19]

Davies

[11] Patent Number: 5,450,603
[45] Date of Patent: Sep. 12, 1995

[54] SIMD ARCHITECTURE WITH TRANSFER REGISTER OR VALUE SOURCE CIRCUITRY CONNECTED TO BUS

[75] Inventor: Daniel Davies, Palo Alto, Calif.

[73] Assignee: Xerox Corporation, Stamford, Conn.

[21] Appl. No.: 993,218

[22] Filed: Dec. 18, 1992

[51] Int. Cl.⁶ .............................................. G06F 13/00
[52] U.S. Cl. ...................... 395/800; 395/280; 364/133; 364/231.9; 364/260.1; 364/DIG. 1
[58] Field of Search ................ 395/800, 200, 275; 364/133, 231.9, 260.1, DIG. 1

[56] References Cited

U.S. PATENT DOCUMENTS

| | | | |
|---|---|---|---|
| 4,204,251 | 5/1980 | Brudevold | 395/325 |
| 4,514,807 | 4/1985 | Nogi | 395/800 |
| 4,731,880 | 3/1988 | Ault | 359/120 |
| 4,745,546 | 5/1988 | Grinberg et al. | 395/800 |
| 4,814,973 | 3/1989 | Hillis | 395/800 |
| 4,831,519 | 5/1989 | Morton | 395/325 |
| 4,850,027 | 7/1989 | Kimmel | 382/49 |
| 4,984,235 | 1/1991 | Hillis et al. | 370/60 |
| 5,113,510 | 5/1992 | Hillis | 395/425 |
| 5,129,092 | 7/1992 | Wilson | 395/800 |
| 5,148,500 | 9/1992 | Belanger | 382/55 |
| 5,148,547 | 9/1992 | Kahle et al. | 395/800 |
| 5,268,856 | 12/1993 | Wilson | 364/748 |
| 5,297,255 | 3/1994 | Hamanaka et al. | 395/200 |
| 5,325,500 | 6/1994 | Bell et al. | 395/425 |

FOREIGN PATENT DOCUMENTS

147857A3 7/1985 European Pat. Off. .
236762A1 9/1987 European Pat. Off. .
293701A2 12/1988 European Pat. Off. .
460970A2 12/1991 European Pat. Off. .

OTHER PUBLICATIONS

Shimura, Patent Abstracts of Japan, vol. 13, No. 96, P-839, 3444, Mar. 7, 1989, abstract of JP-A-63-276659.

Primary Examiner—Alyssa H. Bowler
Assistant Examiner—John Harrity

[57] ABSTRACT

A SIMD parallel processor includes two types of circuitry interconnecting its processing units: One kind interconnects the processing units into an array so that each processing unit can transfer data to an adjacent processing unit in the array and can receive data from an adjacent processing unit; the processing units can, for example, be interconnected in a one-dimensional array. Another kind of interconnecting circuitry includes bus circuitry to permit greater freedom in transferring data to and from processing units. Connected to the bus is a register, so that data can be transferred between processing units by first transferring data from one processing unit to the register and by then transferring data from the register to another processing unit. Or data stored in the register can be sent to a subset or to all of the processing units. Similarly, control circuitry can itself provide data on the bus for transfer to one, a subset, or all of the processing units. A bidirectional register can be connected between each processing unit and the bus, so that a processing unit can be selected to provide data to the bus by selecting its bidirectional register. Similarly, each processing unit can include a memory that can be selected with a write enable signal so that a set of processing units can be selected to receive and store in memory data from the bus.

2 Claims, 10 Drawing Sheets

Fig.2A  Fig.2B

SIMD ARCHITECTURE WITH TRANSFER REGISTER OR VALUE SOURCE CIRCUITRY CONNECTED TO BUS

BACKGROUND OF THE INVENTION

The present invention relates to parallel processors.

Hillis, U.S. Pat. No. 4,814,973 describes interconnections between processor/memories in the Connection Machine from Thinking Machines Corporation.

As Hillis describes in relation to FIGS. 1A and 1B, the processor/memories are interconnected in a two-dimensional square array in which each processor/memory is directly connected to four nearest neighbors in the array. This two-dimensional grid is useful both for writing large amounts of data into the array, as at the beginning of computation, and for reading out the contents of the array, as when interrupting processing and storing state.

In addition, the processor/memories in Hillis are interconnected in a Boolean n-cube of fifteen dimensions for rapid interchange of data in random directions between processor/memories. Each integrated circuit (IC) includes 32 identical processor/memories, and includes routing circuitry, shown in FIG. 11, to route messages through the Boolean n-cube as well as bus connections to the processor/memories on the IC. Each IC is assigned a fifteen digit binary address, and its fifteen nearest neighbors are the ICs whose addresses differ by only one digit from its address. Each IC is connected to its fifteen nearest neighbors, and the system has processing cycles for computations and routing cycles during which message packets, as shown in FIG. 4, are routed from one IC to the next by the routing circuitry in accordance with address information in each packet. The address information is a relative address that is updated as the message is routed from one IC to the next.

As Hillis describes in relation to FIGS. 6A, 6B, 7A, 7B, and 17, the processor/memories on an IC are connected in common to an address and output signal bus that carries decoded instructions and addresses from a microcontroller to an ALU and registers in each processor/memory. Wilson, U.S. Pat. No. 5,129,092 (Wilson '092), describes a SIMD parallel processor for processing data matrices such as images and spatially related data. As shown and described in relation to FIGS. 1 and 2, the processor includes a linear chain of neighborhood processing units with direct data communication links between adjacent processing units. A single controller sends a sequence of instructions to the processing units, so that all processing units receive the same instruction at any given cycle in the instruction sequence. Each processing unit has an associated memory that is a single bit wide, to and from which data is transferred through shift registers. Similarly, each processing unit receives data from and provides data to adjacent processing units using shift registers, which are used for data input and output as described at col. 8 line 24-col. 9 line 14.

As Wilson '092 shows and describes in relation to FIGS. 1, 2, and 5, the processing units form groups of eight, and a host computer and the controller can both send or receive data from the groups via eight bit lines referred to as data byte lines. One of these lines is coupled to an output selector within each processing unit; the output of the selector can be written into memory by enabling a three-state gate. Similarly, each processing unit can deliver data from memory to its line by enabling a three-state gate.

Wilson '092 describes transpose in and transpose out operations for transposing data between memory and an accumulator in relation to FIGS. 6A and 6B. The look-up table and histogram applications described at col. 16 line 53-col. 18 line 18 both include operations that change data between vertical and horizontal formats, as illustrated in FIGS. 6A and 6B.

Wilson, EP-A 293 701 (Wilson '701), describes another such parallel processor. The data input operation is described in relation to FIGS. 1 and 2 at page 5 col. 7 lines 22-43 and the data output operation at page 8 col. 13 lines 9-41.

SUMMARY OF THE INVENTION

The invention deals with a basic problem in SIMD parallel processors. A SIMD parallel processor includes processing units, each able to access its own data in memory. In contrast with a multiple instruction multiple data (MIMD) parallel processor in which each processor can execute an independent sequence of instructions, all the processing units in a SIMD parallel processor receive the same instruction stream. The processing units are interconnected by pair transfer circuitry connecting pairs of processing units, so that when the processing units execute certain instructions in parallel, each processing unit can transfer data to one of its paired processing units and receive data from another of its paired processing units.

SIMD parallel processors are especially useful for performing neighborhood operations on data arrays. The pair transfer circuitry permits efficient data exchange among a group of processing units operating on a part of a data array that defines a neighborhood. For example, a small number of parallel operations can be performed to transfer data to each processing unit from all of its neighboring processing units.

But some operations on data arrays require other types of data transfer. For example, if the processing units form an array that is smaller than the data array on which they are operating, the data array can be handled in segments. But a neighborhood operation at an edge of a segment may require data transfer from one side of the array of processing units to the other, because processing units at opposite sides of the array have data from adjacent locations in the data array. In this and many other situations, it is inconvenient to rely solely on pair transfer circuitry for transferring data to and from processing units.

The invention is based on the discovery of an architecture that overcomes this problem by providing circuitry that can rapidly transfer data to and from processing units in several ways, independent of pair transfer circuitry connecting pairs of processing units.

According to one aspect of the invention, the architecture's interconnecting circuitry includes bus circuitry and, for each processing unit, respective source/destination circuitry connected to the bus circuitry. A processing unit's source/destination circuitry can provide items of data from the processing unit to the bus circuitry and can receive items of data from the bus circuitry for the processing unit. The architecture's interconnecting circuitry also includes a transfer register connected to the bus circuitry so that the transfer register can receive and store items of data from the bus circuitry and can provide stored items of data to the bus circuitry. The architecture's control circuitry includes transfer control circuitry connected to each processing unit's source/destination circuitry and to the transfer register. The transfer control circuitry can provide signals to control transfers of data items through the bus circuitry and storage of data items in the transfer register.

To transfer a data item from a processing unit to the transfer register, the transfer control circuitry can begin by providing signals so that the processing unit's source/destination circuitry receives the data item from the processing unit. Then, the transfer control circuitry can provide signals so that the processing unit's source/destination circuitry provides the data item to the bus circuitry. Finally, the transfer control circuitry can provide signals so that the transfer register receives the data item from the bus circuitry and stores it.

To transfer a stored data item from the transfer register to a set that includes one or more processing units, the transfer control circuitry can begin by providing signals so that the transfer control circuitry provides the stored data item to the bus circuitry. Then, the transfer control circuitry can provide signals so that the source/destination circuitry of each processing unit in the set receives the data item from the bus circuitry. Finally, the transfer control circuitry can provide signals so that the source/destination circuitry of each processing unit in the set provides the data item to its processing unit.

According to another aspect of the invention, the architecture's interconnecting circuitry includes bus circuitry and, for each processing unit, respective destination circuitry connected to the bus circuitry. A processing unit's destination circuitry can receive items of data from the bus circuitry for the processing unit. The architecture's control circuitry includes value source circuitry connected to the bus circuitry so that the value source circuitry can provide an item of data indicating a value to the bus circuitry. The architecture's control circuitry also includes transfer control circuitry connected to each processing unit's destination circuitry. The transfer control circuitry can provide signals to control transfers of items of data from the value source circuitry over the bus circuitry to each processing unit's destination circuitry.

When the value source circuitry provides a data item indicating a value to the bus circuitry for transfer to a set that includes one or more processing units, the transfer control circuitry can begin by providing signals so that the destination circuitry of each processing unit in the set receives the data item from the bus circuitry. Then, the transfer control circuitry can provide signals so that the destination circuitry of each processing unit in the set provides the data item to its processing unit.

Each of the transfers described above includes an act that can affect less than all of the processing units. The transfer of a data item to the transfer register, for example, includes an act that provides data from the source/destination circuitry of only one processing unit to the bus circuitry. Similarly, transfers of data items to a set of processing units can include acts that provides data items only to some of the processing units. Therefore, the transfer control circuitry can be implemented to provide selection signals. In one implementation, the transfer control circuitry provides only two types of selection signals—one type of selection signal selects only one processing unit's source/destination circuitry to provide a data item to the bus circuitry, and the other type of selection signal write enables memory circuitry only in processing units that are in a set receiving a data item.

The following description, the drawings, and the claims further set forth these and other aspects, objects, features, and advantages of the invention.

BRIEF DESCRIPTION OF THE DRAWINGS

FIG. 2A is a flow chart showing general acts in transferring data from a processing unit to a transfer register using components as shown in FIG. 1.

FIG. 2B is a flow chart showing general acts in transferring data from a transfer register to a set of processing units using components as shown in FIG. 1.

DETAILED DESCRIPTION

A. Conceptual Framework

Figure 1:
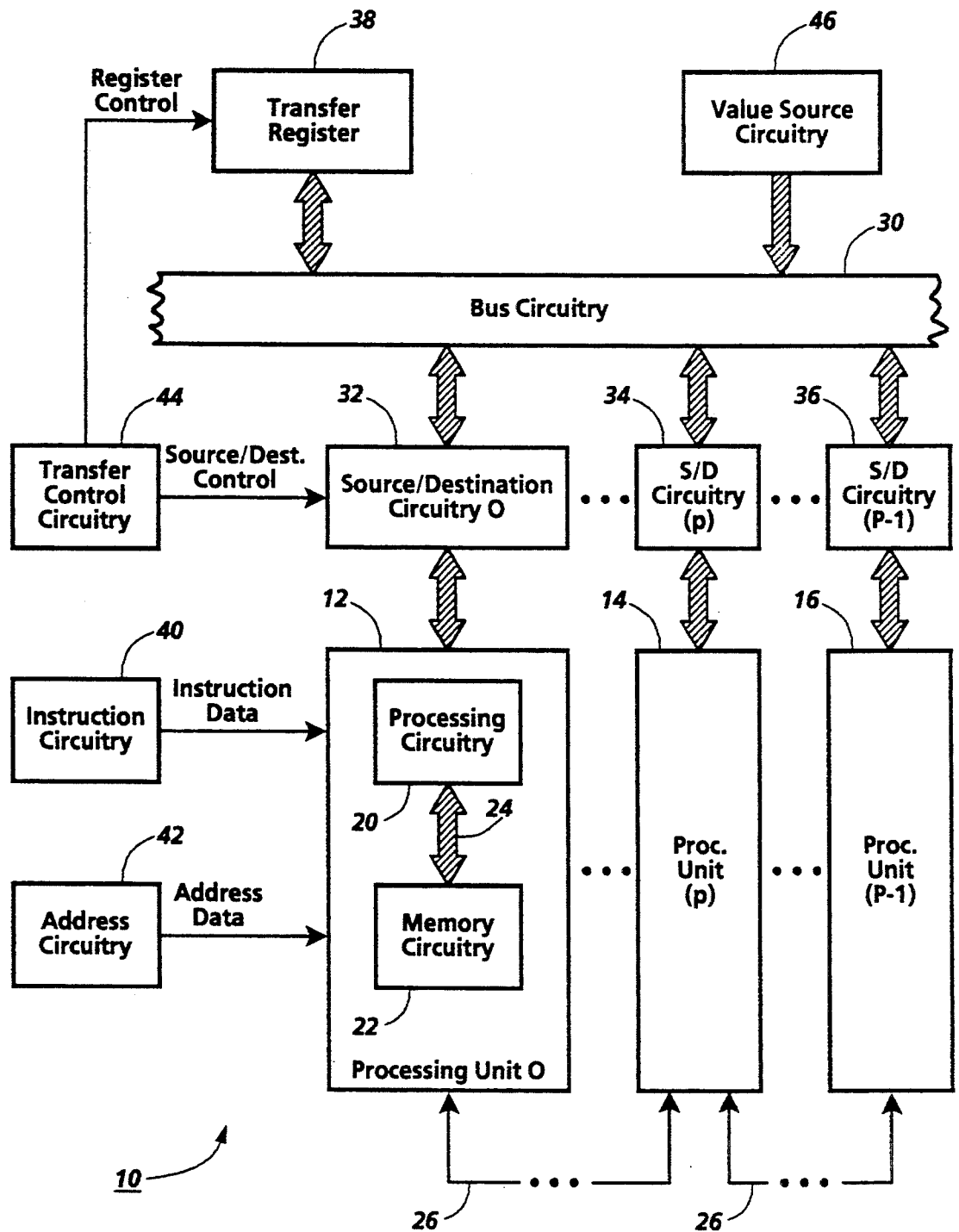
FIG. 1 is a schematic block diagram showing components of a SIMD parallel processor, including bus circuitry, source/destination circuitry for each processing unit, a transfer register, and value source circuitry.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "sets" memory circuitry or a memory cell by storing data in the memory circuitry or memory cell. If the data stored is different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

A processor or other component of circuitry "uses" an item of data in performing an operation when the result of the operation depends on the value of the item. For example, the operation could perform a logical or numerical operation on the item or could use the item to access another item of data.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A first component provides a signal to a plurality of other components "in parallel" when all of the other components receive the signal from the first component at approximately the same time.

An operation or component can provide or transfer an item of data to a single receiving component "in parallel" if the item of data includes a plurality of bits and the receiving component receives all of the bits at approximately the same time.

37 Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

A first component "controls" a second component when signals from the first component determine how the second component operates.

Any two components are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections. "Connecting circuitry" is circuitry that connects two or more components. "Interconnecting circuitry" is circuitry that interconnects a plurality of components. The components are interconnected "into an array" by interconnecting circuitry that permits transfer of data to and from a component that can be mapped to a given position in an array only through connections to other components that can be mapped to adjacent positions in the array. The array is "one-dimensional" if each component has at most two adjacent components, so that the components together can be mapped onto a line according to their interconnections.

"Bus circuitry" or a "bus" is circuitry connecting a plurality of components, at least one of which is a "source" and at least one of which is a "destination," such that the bus circuitry is capable of transferring a signal provided by any of the sources to all of the destinations. Some devices connected to bus circuitry can act either as sources or destinations.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

A "parallel processor" is a processor that includes more than one processing unit, each able to perform operations on data in parallel with the others.

B. General Features

Figure 2C:
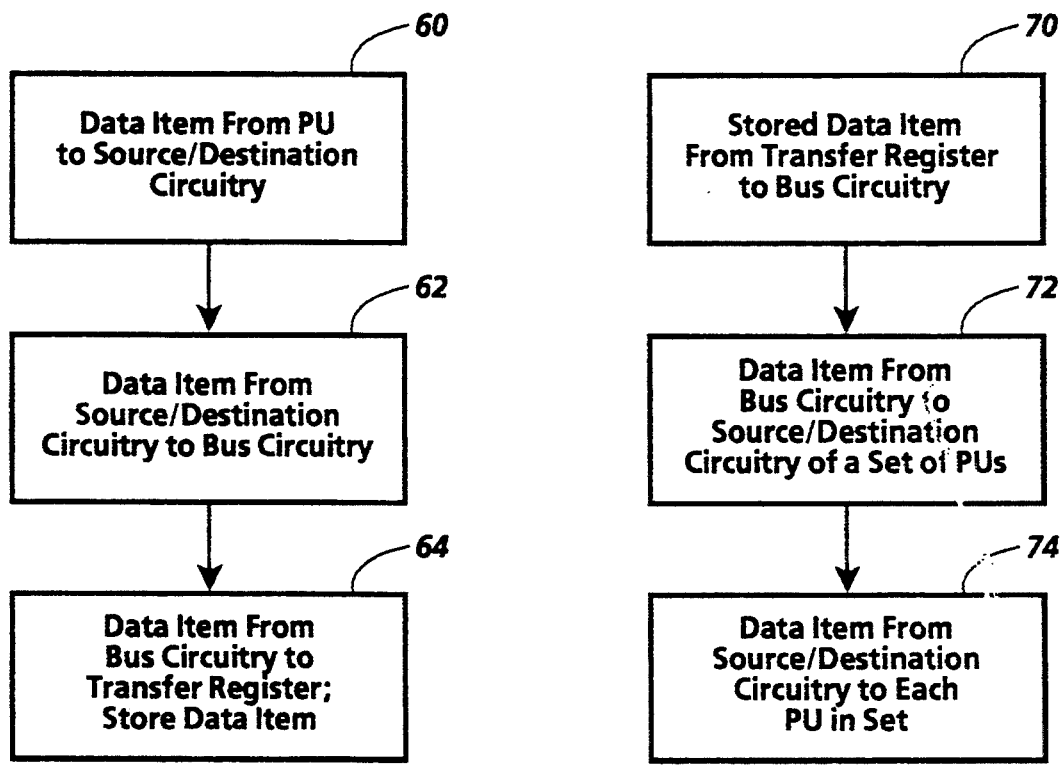
FIG. 2C is a flow chart showing general acts in transferring data from value source circuitry to a set of processing units using components as shown in FIG. 1.
Figure 2C:
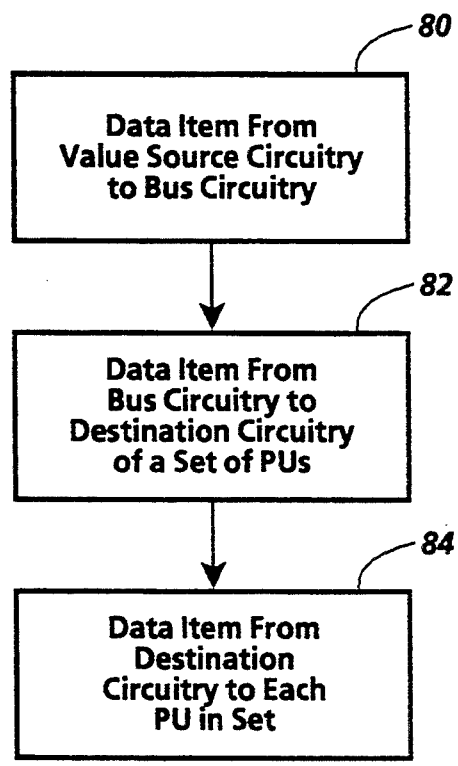

FIGS. 1–2C illustrate general features of the invention. FIG. 1 shows circuitry for transferring items of data to and from processing units in a SIMD parallel processor. FIGS. 2A–2C show general acts in data transfers using circuitry like that of FIG. 1.

Processor 10 in FIG. 1 includes P processing units, including processing units 12, 14, and 16, illustratively numbered zero through (P-1). Each processing unit includes processing circuitry 20, memory circuitry 22, and accessing circuitry 24 connected to processing circuitry 20 and memory circuitry 22.

The processing units are interconnected in two ways: Pairs of processing units are connected by pair transfer circuitry 26, with processing units 12 and 16 illustratively paired with one adjacent processing unit each and with processing unit 14 paired with two adjacent processing units so that the processing units are interconnected in a one-dimensional array. Also, bus circuitry 30 is connected to source/destination circuitry for each processing unit, illustrated by source/destination circuitry 32 for processing unit 12, source/destination circuitry 34 for processing unit 14, and source/destination circuitry 36 for processing unit 16. Transfer register 38 is connected to bus circuitry 30 so that it can receive an item of data from bus circuitry 30, store the item of data, and then subsequently provide the stored item of data to bus circuitry 30 for transmission.

Processor 10 also includes control circuitry that controls the processing units and the interconnecting circuitry. The control circuitry includes instruction circuitry 40, address circuitry 42, transfer control circuitry 44, and value source circuitry 46.

Instruction circuitry 40 provides items of instruction data to the processing units in parallel. The items of instruction data indicate a sequence of instructions, and processing circuitry 20 responds to the instructions by performing operations on items of data.

Address circuitry 42 similarly provides items of address data to the processing units in parallel. The items of address data indicate a series of addresses, and when memory circuitry 22 receives an address, an item of data stored in memory circuitry 22 can be accessed through accessing circuitry 24.

Transfer control circuitry 44 provides signals to control each processing unit's source/destination circuitry, including source/destination circuitry 32, 34, and 36, and also to control transfer register 38. Transfer control circuitry 44 can therefore provide signals to control transfers of data to and from processing units.

Value source circuitry 46 provides data indicating a value to bus circuitry 30. The indicated value can, for example, be a constant.

In FIG. 2A, in the act in box 60, transfer control circuitry 44 first provides signals so that the source/destination circuitry of one processing unit receives an item of data from the processing unit. In the act in box 62, transfer control circuitry 44 provides signals so that the source/destination circuitry of the processing unit provides the data to the bus circuitry. In the act in box 64, transfer control circuitry provides signals so that transfer register 38 receives the item of data from bus circuitry 30 and stores the item of data.

In FIG. 2B, in the act in box 70, transfer control circuitry 44 provides signals so that transfer register 38 provides a stored data item to bus circuitry 30. In the act in box 72, transfer control circuitry 44 provides signals so that the source/destination circuitry of each processing unit in a set of processing units receives the data item from bus circuitry 30. In the act in box 74, transfer control circuitry 44 provides signals so that the source/destination circuitry of each processing unit in the set provides the data item to its processing unit.

In FIG. 2C, in the act in box 80, value source circuitry 46 provides a data item indicating a value to bus circuitry 30. In the act in box 82, transfer control circuitry 44 provides signals so that the destination circuitry of each processing unit in a set of processing units receives the data item from bus circuitry 30. In the act in box 84, transfer control circuitry 44 provides signals so that the destination circuitry of each processing unit in the set provides the data item to its processing unit.

C. General Implementation Features

The general features described above in relation to FIGS. 1–2C could be implemented in many different ways with a wide variety of components and with various integrated circuit technologies. The following implementation employs commercially available byte-slice integrated circuits to perform coprocessing in a Sun SPARCStation workstation.

Figure 3:
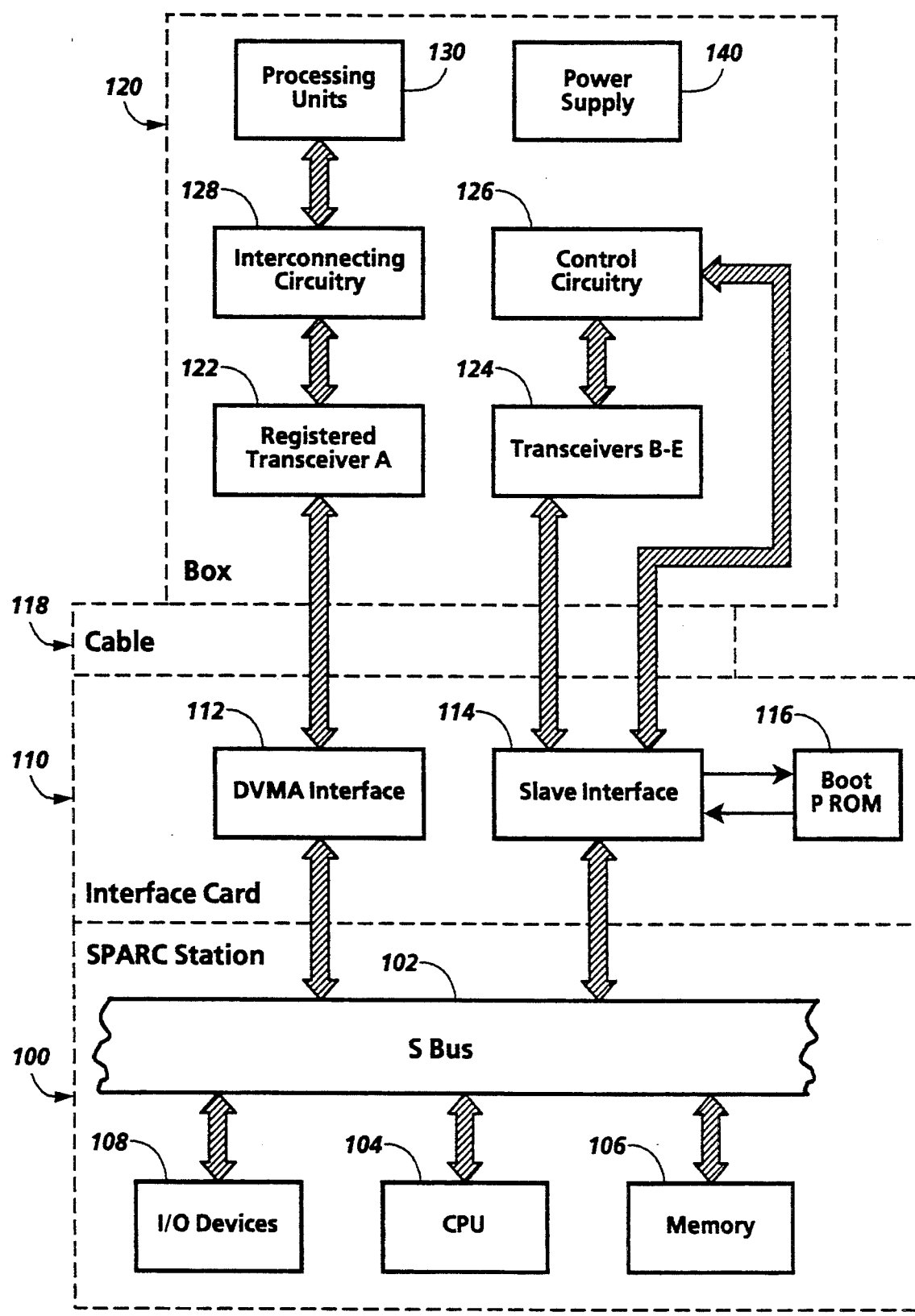
FIG. 3 is a schematic block diagram showing components in an implementation of a SIMD parallel processor connected to an SBus of a SPARCStation.
Figure 4:
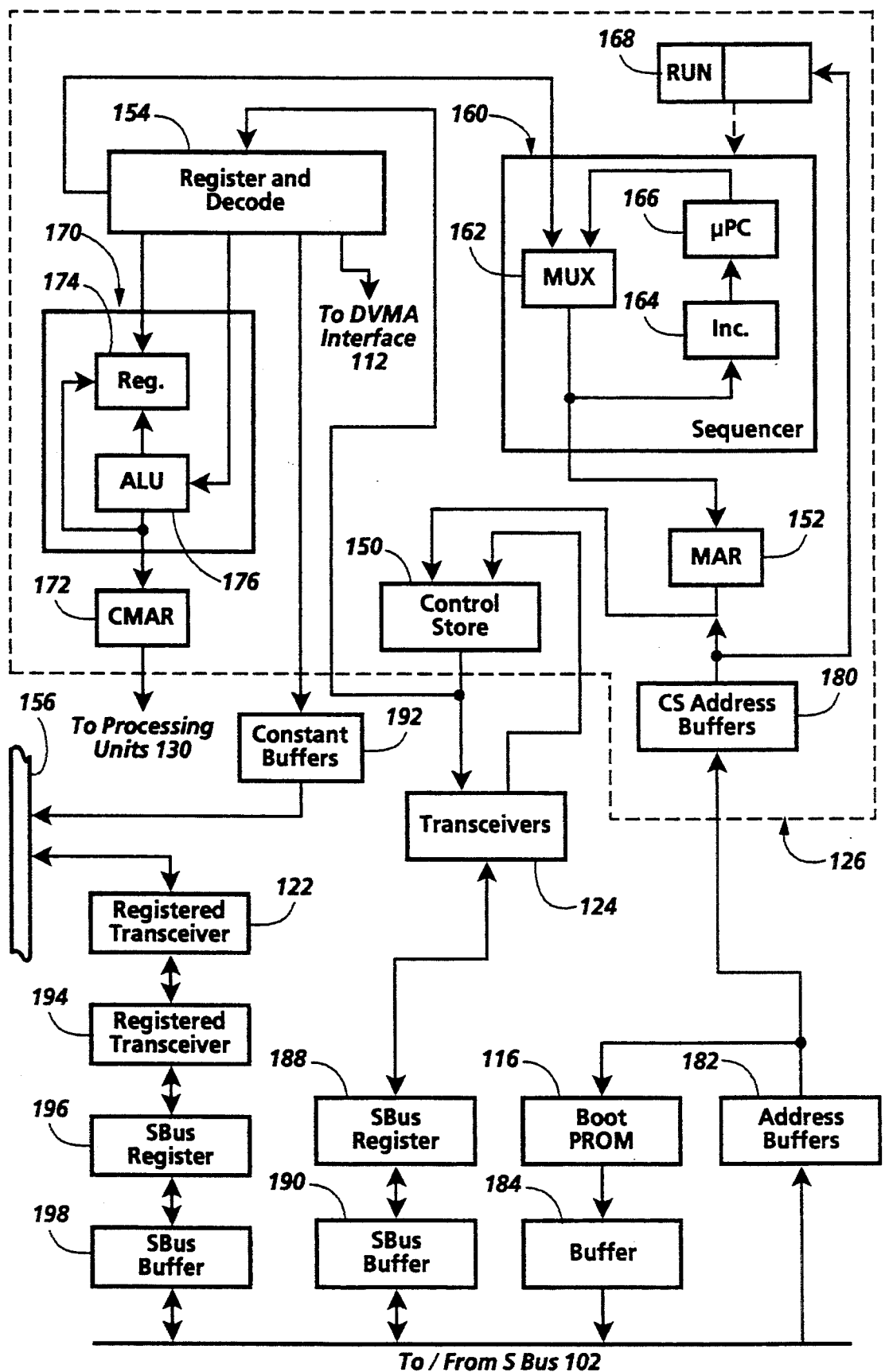
FIG. 4 is a schematic block diagram showing components of the control circuitry of FIG. 3.
Figure 5:
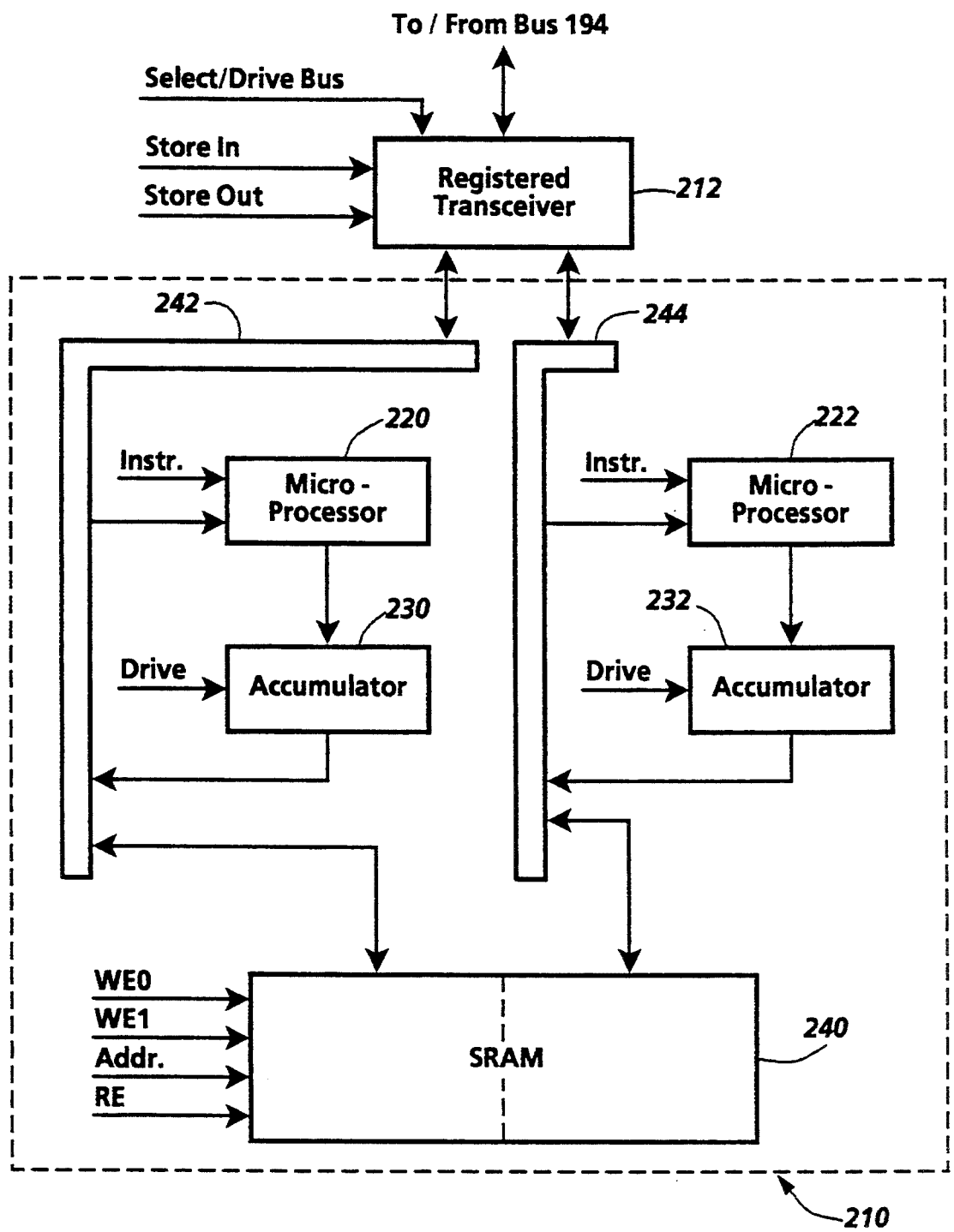
FIG. 5 is a schematic block diagram showing components of a processing unit in FIG. 3.
Figure 6:
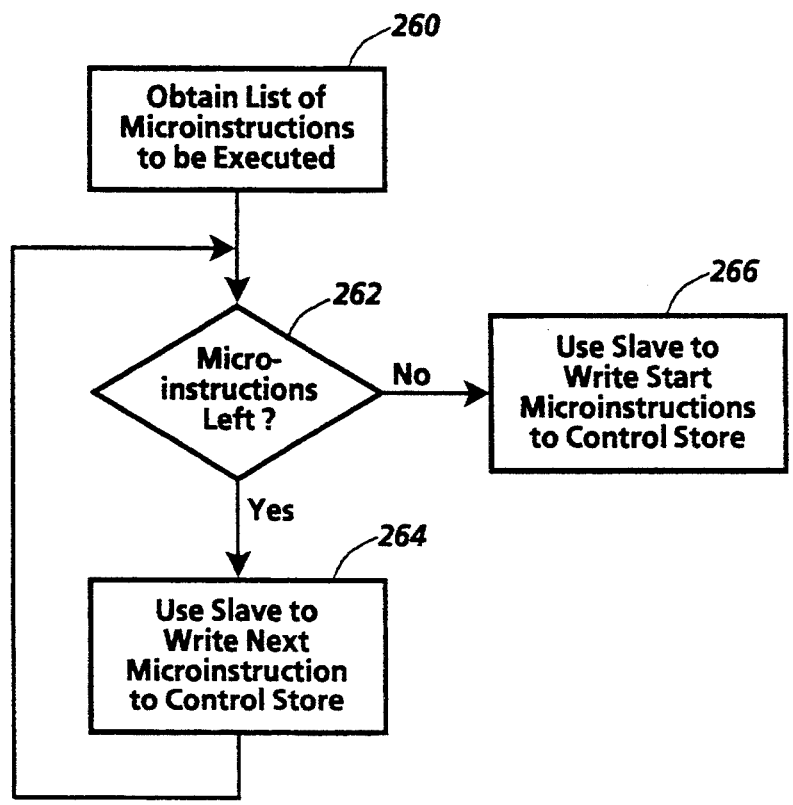
FIG. 6 is a flow chart showing general acts in loading microinstructions in a control store in FIG. 4.
Figure 7:
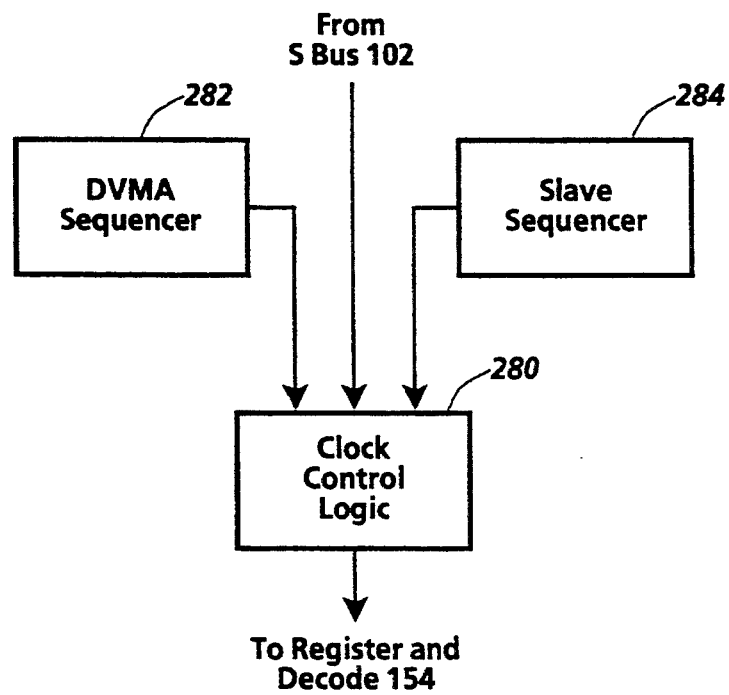
FIG. 7 is a schematic block diagram showing components that control clock signals to a box in FIG. 3.

FIG. 3 shows general components of the implementation and their connections to components in the host workstation. FIG. 4 shows components of the control circuitry in FIG. 3. FIG. 5 shows components of a processing unit in FIG. 3. FIG. 6 shows general acts in writing microinstructions to the control store in FIG. 4. FIG. 7 shows components that provide clock signals to components shown in FIGS. 4 and 5 for microinstruction execution.

FIG. 3 shows an implementation in which SPARCStation 100 serves as a host. SPARCStation 100 includes SBus 102, to which are connected central processing unit (CPU) 104, memory 106, and input/output (I/O) devices 108. Memory 106 has sufficient capacity to store image data defining several full size images, each requiring at least 1 megabyte of memory. Memory 106 can also store instruction data indicating conventional instructions CPU 104 can execute to perform operations on the image data, including compression, decompression, and other image manipulation operations. I/O devices 108 may include scanners, printers, modems, displays, disk drives, network connections, and other sources and destinations of data defining images.

Mounted in SPARCStation 100 is interface card 110, a printed circuit board on which are mounted components that form direct virtual memory access (DVMA) interface 112, slave interface 114, and boot PROM 116, a programmable read-only memory component. Interface card 110 also holds conventional connectors (not shown) for mounting card 110 into SPARCStation 100 and for providing an electrical connection to SBus 102. Interface board also holds conventional connectors (not shown) to which cable 118, which may be as short as 12 inches, can be mounted to provide an electrical connection to box 120. Circuitry (not shown) formed on a surface of interface card 110 provides electrical connections between the connectors and DVMA interface 112 and slave interface 114 and between slave interface 114 and boot programmable read only memory (PROM) 116.

DVMA interface 112, a master interface, and slave interface 114 can be implemented in accordance with SBus Specification B.O, Sun Microsystems, Inc. Part No. 800-5922-10, 1990, which describes signal protocols for SBus master and slave interfaces. Each interface can have a respective sequencer. In addition, as described below, card 110 includes a number of components that provide signals to components in box 120 or receive signals from components in box 120, thus performing functions of DVMA interface 112 or slave interface 114.

Boot PROM 116 can be an 8K×8 bit memory accessible by slave interface 14, which is only capable of byte reads from boot PROM 116 and of single word control store accesses.

Box 120 includes a printed circuit board with conventional connectors (not shown), to which cable 118 can be mounted to provide electrical connections to DVMA interface 112 and slave interface 114. Circuitry formed on the surface of the board (not shown) provides electrical connections from the connectors to components on the board, including registered transceiver 122, transceivers 124, and control circuitry 126. Registered transceiver 122, designated A, is further connected to interconnecting circuitry 128, which interconnects processing units 130. Transceivers 124, designated B-E, are connected through parallel lines to control circuitry 126. These transceivers can be implemented with conventional 32 bit bidirectional transceivers.

Box 120 also includes power supply 140, which can be a conventional power supply capable of providing approximately 40 amps at 5 volts, or 200 watts. Box 120 also contains a cooling fan (not shown).

The arrangement shown in FIG. 3 solves several problems in using a host workstation: For a SPARCStation, the card size and constraints on space, power consumption, signal loadings, and heat dissipation make it infeasible to include an entire SIMD parallel processor on a single card; therefore, box 120 includes the processing units, control circuitry, and most of the interconnecting circuitry, and card 110 includes only a small number of components that provide a connection between box 120 and SBus 102. In addition, dividing components into two modules in this way would allow card 110 to be replaced with an interface to another computer without significantly changing box 120. Finally, the extra space provided by box 120 facilitates debugging.

FIG. 4 shows components within control circuitry 126 and their connections to other components. In addition to the components shown, control circuitry 126 includes a conventional clock driver (not shown) for receiving and distributing the clock signal of SBus 102 at a frequency of 25 MHz, i.e. one cycle per 40 nsec, so that it can drive several components. The circuitry is designed so that control circuitry 126 can perform each possible instruction in one 40 nsec cycle. In other words, a new microinstruction and microinstruction address should be provided at each clock tick.

Control store 150 can be a 16K×128 bit static random access memory (SRAM) for storing microinstructions received from SBus 102. Upon receiving a microinstruction's address from memory address register (MAR) 152, a conventional register, control store 150 provides the microinstruction to microinstruction register and decode 154. Register and decode 154 provides various control signals, including instructions to the processing circuitry of each processing unit and buffer select signals to control transfer of data on common data bus 156.

Microcode sequencer 160 loads addresses into MAR 152. Multiplexer (MUX) 162 selects either a jump address from register and decode 154 or the address that immediately follows the previous address, generated by incrementer 164 and microprogram counter ($\mu$PC) 166. Sequencer 160 can be implemented with an IDT49C410 microprogram sequencer, described in 1990/1991 *Logic Databook*, Integrated Device Technology, Inc., Santa Clara, Calif., 1990, sections 5.4 and 7.4. Sequencer 160 can receive its opcodes directly from register and decode 154.

Control/status register 168 is a conventional register whose most significant bit, called the RUN bit, indicates whether sequencer 160 should perform normal addressing or should provide a special address that holds the coprocessor. The IDT49C410 sequencer has a Jump-Zero instruction to which it responds by providing the address of location 0 to MAR 152. Therefore, the special address can be location 0, and the microinstruction at location 0 in control store 150 can in general be a nonoperative (no op) instruction that is repeatedly retrieved until the microprogram is ready to execute.

The RUN bit can be cleared by the SBus reset signal when SPARCStation 100 is reset. Slave interface 114 can also read or write control/status register 168, which could include only the RUN bit. The address space addressed by CS address buffers 180 can be divided so that only the first few bits of an address are used to decode whether the address is that of control/status register 168.

As suggested by the dashed line from control/status register 168 to sequencer 160, the RUN bit is not provided directly to sequencer 160, but is received by register and decode 154, which then responds appropriately.

While the RUN bit is set, register and decode 154 receives in each cycle a microinstruction fetched from control store 150 and, in the next cycle, decodes the microinstruction and executes it by providing control signals to other components. Upon detecting that the RUN bit has been cleared, however, register and decode 154 provides a JumpZero instruction to sequencer 160 and ignores whatever microinstruction has been fetched in the previous cycle.

After a microprogram has been stored in control store 150, execution of the microprogram can be caused by writing a microinstruction to location 0 that, when executed, provides the starting address of the microprogram to sequencer 160 and again sets the RUN bit so that sequencer 160 can begin normal addressing. Since the microinstruction from location 0 is fetched from control store 150 twice before the first instruction of the microprogram is fetched, every microprogram should begin with a no op instruction that provides a "Continue" opcode to sequencer 160. This causes incrementer 164 to increment the address in $\mu$PC 166, beginning normal address incrementing.

The final operation of each microprogram can write a completion code to a location in SPARCStation memory, and whenever the SPARCStation sees the completion code, it can clear the RUN bit. Until the RUN bit is cleared, the microprogram can perform a no op loop or, alternatively, the microprogram itself could clear the RUN bit after writing the completion code.

Address processor 170 loads addresses into cache memory address register (CMAR) 172, connected to provide an address to each processing unit. The previous address provided to CMAR 172 can be stored in register 174. Alternatively, an address from register and decode 154 can be loaded directly into register 174. ALU 176 can then operate on the value in register 174 to obtain the next address. Address processor 170 can be implemented with an IDT49C402B microprocessor, described in 1990/1991 *Logic Databook*, Integrated Device Technology, Inc., Santa Clara, Calif., 1990, sections 5.3 and 7.2. Register 174 can be the Q register or any of the other internal registers of address processor 170. Register and decode 154 can provide instructions, register specifiers, a carry signal, and addresses to address processor 170, and can also provide a write enable signal to the memory circuitry of one or more processing units.

Control store address buffers 180 are connected to receive addresses from address buffers 182 in slave interface 114 on interface card 110. This provides a path through which CPU 104 in SPARCStation 100 can provide an address to control store 150. Also, SBus 102 can provides two address bits through this path that are hardwired to logic that write enables 32 bits of SRAM or one 32 bit bank of SRAM at a time, since only one 32 bit word at a time can be received from SBus 102.

Each of transceivers 124 is connected to provide 32 bits to SBus register 188 on interface card 110, which in turn can provide data to SBus buffer 190, all of which can be implemented with conventional 32 bit components. This circuitry provides a path through which one 32 bit segment at a time of a 128 bit microinstruction in control store 150 can be read to SBus 102, one of the functions of slave interface 114.

Transceivers 124 are also connected to receive data from SBus register 188, which in turn receives data from SBus 102 through SBus buffer 190. Therefore, this circuitry also provides a path through which a microinstruction from SBus 102 can be loaded into control store 150, another function of slave interface 114.

In addition to providing addresses for control store 150 and for control/status register 168, address buffers 182 also provide addresses to boot PROM 116. Boot PROM 116 is read at boot time to identify card 110. Therefore, it begins at address 0 relative to its SBus slot. Boot PROM 116 stores data that indicates FCode instructions that can be executed by CPU 104 during boot to obtain data indicating an identifier of card 110, including what kind of card it is and which revision; indicating address space parameters; and indicating what driver should be loaded to communicate with card 110. These instructions can be written according to conventional techniques using the instructions set forth in SBus Specification B.O, Sun Microsystems, Inc. Part No. 800-5922-10, 1990, Appendix C, pp. 143–168, entitled "FCode Reference." Each instruction from boot PROM 116 is provided to SBus 102 through buffer 184.

Boot PROM 116 is read using byte accesses. If CPU 104 tries to read a 32 bit word during boot time, slave interface 112 responds by returning a byte response on Ack[2:0], causing CPU 104 to read one byte at a time. Boot PROM 116 drives only the most significant byte of the SBus data line.

FIG. 4 also shows constant buffers 192, a set of buffers through which register and decode 154 can provide data to common data bus 156. Common data bus 156 is also connected to processing units 130 and is therefore a part of interconnecting circuitry 128 in FIG. 3.

As shown, common data bus 156 is also connected to receive data from SBus 102 and provide data to SBus 102 through registered transceiver 122, designated A in FIG. 3. Transceiver 122 is connected to provide 32 bits to registered transceiver 194 on interface card 110, which in turn can provide data to SBus register 196 and SBus buffer 198, all of which can be implemented with conventional 32 bit components. This circuitry provides a path through which an item of data can be transferred from a processing unit to SBus 102, one of the functions of DVMA interface 112.

Transceiver 122 is also connected to receive data from registered transceiver 194, which in turn receives data from SBus 102 through SBus register 196 and SBus buffer 198. Therefore, this circuitry also provides a path through which an item of data can be transferred from SBus 102 to a set of processing units, another function of DVMA interface 112.

Register and decode 154 is also connected to provide some control signals directly to DVMA interface 112 on card 110. As a result, a microinstruction can provide signals to DVMA interface 112 so that it acts as a master on SBus 102.

FIG. 5 shows processing unit 210, the pth one of processing units 130, together with respective registered transceiver 212. Registered transceiver 212 provides a connection through which processing unit 210 receives data from common data bus 156 and provides data to common data bus 156. Therefore, registered transceiver 212 is a part of interconnecting circuitry 128 in FIG. 3. Registered transceiver 212 can be implemented with a 32 bit set of conventional registered transceivers, such as four 8 bit 74FCT651 transceivers from Integrated Device Technology, Inc., or any equivalent circuitry, such as two 16 bit transceivers. Registered transceiver 212 responds to signals from register and decode 154 by storing data from bus 156; by storing data from buses 242 and 244; by driving bus 156; or by driving buses 242 and 244.

Processing unit 210 includes microprocessors 220 and 222, each of which can be implemented with an IDT49C402B microprocessor, described in 1990/1991

*Logic Databook*, Integrated Device Technology, Inc., Santa Clara, Calif., 1990, sections 5.3 and 7.2. In this implementation, each microprocessor includes an arithmetic logic unit (ALU), a Q register, a 64-register bank, and internal shift logic so that registers can be cascaded to form very long shift registers. An array of P processing units, each with two 16 bit microprocessors, can thus load, store, or operate on 32*P bits per clock cycle. All the microprocessors can receive signals indicating instructions in parallel from register and decode 154.

Accumulators (ACC) 230 and 232 are connected to receive data output by microprocessors 220 and 222, respectively. Accumulators 230 and 232 are necessary because microprocessors 220 and 222 do not produce cache write data quickly enough. In addition, accumulators 230 and 232 make it possible to perform an operation while shifting a microprocessor's Q register, because the output from each microprocessor's ALU can be stored in its accumulator and then fed back to the microprocessor's data input during the next cycle. Each accumulator can be implemented with a conventional 16 bit register with tri-state outputs. The accumulators are controlled in parallel by signals from register and decode 154 indicating whether to provide output.

Processing unit 210 also includes static RAM (SRAM) 240, a 64K ×32 bit memory, connected through internal buses 242 and 244 so that 16 bits of each data unit are accessible by microprocessor 220 and the other 16 bits are accessible by microprocessor 222. SRAM 240 can be implemented with a Motorola MCM3264 module. An array of P processing units, each with one such memory module, can thus store a total of P*2M bits of data. SRAM 240 and each of the other memory modules receives addresses in parallel from CMAR 172, and each memory module also receives write enable signals and read enable signals from register and decode 154. Signals from register and decode 154 can write enable or read enable both halves of a data unit, and separate signals can also indicate write enables to each half of each data unit. SRAM 240 can be managed as a cache memory.

As shown, internal buses 242 and 244 are each connected to registered transceiver 212 and to SRAM 240. In addition, bus 242 is connected to receive data from accumulator 230 and to provide data to processor 220, while bus 244 is connected to received from accumulator 232 and to provide to processor 222. Data transfer on internal buses 242 and 244 is controlled by signals from register and decode 154 to registered transceiver 212, to accumulators 230 and 232, and to SRAM 240 indicating which source should drive the buses. The signal to SRAM 240 is a read enable signal as mentioned above.

Data can be transferred from SBus 102 to either of microprocessors 220 and 222 by first writing the data into SRAM 240 through the respective internal bus 242 or 244. Then the data is read onto the respective internal bus 242 or 244 and the microprocessor executes an instruction causing it to read data from the internal bus. Rather than following this path, data could be provided more directly to each microprocessor. For example, register and decode 154 could be connected to a separate transfer enable line for each microprocessor, so that data from bus 102 could be written directly to each microprocessor.

If SRAM 240 is implemented with a dual port memory component, rather than a single port component as shown, microprocessors 220 and 222 can be connected to one memory port and registered transceiver 212 can be connected to the other. Write accesses from the microprocessors and from registered transceiver 212 can be synchronized to prevent collisions.

Register and decode 154 includes logic that produces control signals in response to microinstructions from control store 150 according to conventional techniques. The microinstructions could be encoded in a wide variety of ways. For example, each microinstruction could include a three bit field indicating a source to drive bus 194; a two bit field indicating a source to drive buses 242 and 244; a six bit field indicating which SRAMs are write enabled; a ten bit field indicating an instruction for the microprocessors; two six bit fields indicating microprocessor A register and B register, respectively; a two bit field to set microprocessor carry inputs; a ten bit field indicating an instruction for address processor 170; two six bit fields indicating A register and B register, respectively, in address processor 170; a four bit field indicating an instruction for sequencer 160; a two bit field that selects a source for a single bit that controls whether a branch is taken; a single bit field indicating loading of $\mu$PC 166 in sequencer 160; a single bit field indicating the carry in of sequencer 160; a single bit field indicating the carry in of address processor 170; and a sixteen bit field indicating a constant for sequencer 160, address processor 170, or the microprocessors.

In FIG. 6, the act in box 260 obtains a list of microinstructions to be executed. Host CPU 104 can, for example, obtain a list by retrieving a list from memory 106 or by executing instructions that produce a list.

The act in box 262 begins an iterative operation that loads each microinstruction into control store 150. During the act in box 264 for each iteration, slave interface 114 writes a microinstruction into control store 150. Host CPU 104 can, for example, provide an address to address buffers 182 and a series of four 32 bit microinstruction segments to SBus buffer 190, together with signals to a sequencer in slave interface 114 requesting each 32 bit microinstruction segment be loaded at the address.

In response to the request, slave interface 114 can provide control signals to transfer each microinstruction segment in the series to SBus register 188 and to a respective one of transceivers 124. Each microinstruction is received in four 32 bit segments, and each 32 bit segment is written to control store 150 as it is received. Slave interface 114 can also provide control signals to transfer the address to CS address buffers 180 and to control the output from MAR 152 so that the address in CS address buffers 180 is presented at the address port of control store 150. Slave interface 114 can also provide signals to write enable 32 bits of SRAM in control store 150. Then, slave interface 114 can provide a write signal to control store 150 so that a 32 bit segment of the microinstruction is written into the write enabled 32 bits at the address in CS address buffers 180.

A special start sequence of microinstructions can be written into an appropriate location in control store to start execution of a list of microinstructions. Therefore, when the list is completely written into the control store, the act in box 266 is performed, during which slave interface 114 writes the start sequence.

When the RUN bit is clear, as described above, sequencer 160 can repeatedly receive a JumpZero instruction, so that it repeatedly fetches a no op microinstruction at location 0. The start sequence can therefore be written by writing a JUMP-to-location-n microinstruction to location 0, where n is the starting location of the microinstructions to be executed next. Subsequently, the RUN bit can be set by slave interface 114 in response to the current SBus master.

Due to pipelining, each JUMP microinstruction affects two cycles, the first to obtain and latch the address of the next microinstruction into MAR 152 and the second to fetch the microinstruction at the address in MAR 152. Therefore, the address in MAR 152 is that of location 0 until the JUMP-to-location-n microinstruction is executed, and as a result of the preceding JUMP-to-location-0 microinstruction, the JUMP-to-location-n microinstruction is again fetched from location 0.

Because the JUMP-to-location-n microinstruction is fetched twice, it is executed twice. Each time it is executed, the microinstruction at location n is fetched. Therefore, the microinstruction at location n is also executed twice, and it can be a processor no op that provides a "Continue" opcode to sequencer 160, causing sequencer 160 to start incrementing the address so that the microinstruction at location n+1 is fetched, and so forth.

Before the act in box 260 and after the act in box 266, host CPU 104 can perform any of a wide variety of activities. For example, if host CPU 104 is managing a queue of lists of microinstructions, each to be loaded to control store 150 in the manner shown in FIG. 6, CPU 104 can maintain the queue and perform any operations necessary to obtain subsequent lists on the queue. CPU 104 can also perform operations to determine whether the next list on the queue is already loaded into control store 150, in which case it need not be loaded again, but can be called by loading a JUMP-to-location-n microinstruction as in the act in box 266. Host CPU 104 can perform multitasking, in which case it can perform other tasks after loading a list of microinstructions. Or it could wait for execution of the list to be completed or for an interrupt from the coprocessor.

FIG. 7 illustrates components that control clock signals so that a microinstruction can be loaded into control store 150 without interfering with execution of a previous microinstruction. Clock control logic 280 on card 110 receives clock signals from SBus 102, as do other components on card 110 including DVMA sequencer 282, slave sequencer 284, and SBus register 188. Clock control logic 180 always provides a clock signal to components in box 120, unless it receives a signal from DVMA sequencer 282 or from slave sequencer 284 indicating clock signals should not be provided to box 120. For example, whenever slave sequencer 284 is providing control signals to load a microinstruction into control store 150, it provides a signal to clock control logic 180 to prevent clock signals. In general, DVMA sequencer 282 stops clock signals when DVMA sequencer 282 either is attempting to gain control of SBus 102 as indicated by a Bus Grant signal from an SBus arbiter or is awaiting a signal from slave sequencer 284 on the SBus Ack[2:0] lines.

Each clock signal from clock control logic 280 goes to register and decode 154 and can also go directly or via register and decode 154 to any other component in box 120 that requires a clock signal. Register and decode 154 responds to a clock signal by decoding a microinstruction read from control store 150. Other components that include registers must also receive clock signals. For example, in the implementation of FIGS. 4 and 5, sequencer 160, address decoder 170 and microprocessors 220 and 222 must receive clock signals because of their internal registers. Similarly, registered transceivers 122, 194, and 212; MAR 152; CMAR 172; SBus registers 188 and 196; and accumulators 230 and 232 must receive clock signals although, as noted above, SBus register 188 can receive clock signals directly from SBus 102. Some other components may be implemented to require clock signals, such as control store 150 and SRAM 240; these components may also be implemented so that no clock signal is required, but with register and decode 154 providing read enable and write enable signals. A sequence of several clock signals may all involve a single microinstruction, from obtaining its address to storing data in SRAM 240 in response to its execution.

In addition to the general implementation features above, a number of features specific to this invention are set forth below, including features of an implementation of interconnecting circuitry 128 in FIG. 3.

D. General Application Features

The general implementation features described above could be used in a wide variety of data processing applications. They are expected to be particularly useful, however, in performing some types of image processing more rapidly than they could be performed on a serial processor. In particular, the features described above could be used to implement techniques similar to those described in Serra, J., *Image Analysis and Mathematical Morphology*, Academic Press, 1982 and Serra, J., *Image Analysis and Mathematical Morphology, Volume 2: Theoretical Advances*, Academic Press, 1988. Such techniques may be used, for example, to provide document services, such as removal of noise or other non-informative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The features described above can be used to implement basic image processing operations, such as reduction, enlargement, rotation, tiling, and arithmetic operations on pixel values such as bit counting.

An implementation of reduction and enlargement using the features described above is described in co-pending coassigned U.S. patent application Ser. No. 07/993,169 now abandoned, entitled "Subsampling and Spreading Circuitry for SIMD Architecture" ("the Reduction/Enlargement application"), incorporated herein by reference.

Implementations of rotation using the features described above are described in copending coassigned U.S. patent application Ser. Nos. 07/993,169, now abandoned, entitled "One Dimensional SIMD System for Performing Orthogonal Rotations," and 07/994,490, entitled "One Dimensional SIMD System with Buffers for Performing Orthogonal Rotations," ("the Rotation applications") both incorporated herein by reference.

An implementation of tiling using the features described above is described in copending coassigned U.S. patent application Ser. No. 07/993,286 now issued as U.S. Pat. No. 5,428,804, entitled "Edge Crossing Circuitry for SIMD Architecture" ("the Tiling application"), incorporated herein by reference.

Implementations of operations on operands with plural pixel values that can use the features described above are described in copending coassigned U.S. patent application Ser. Nos. 07/993,925, now issued as U.S. Pat. No. 5,408,670, entitled "Performing Arithmetic in Parallel on Composite Operands with Packed Multi-bit Components"; 07993,213,now issued as U.S. Pat. No. 5,375,080, entitled "Performing Arithmetic on Composite Operands to Obtain a Binary Outcome for Each Multi-bit Component"; and 07/993,938 entitled "Masks for Selecting Multi-bit Components in a Composite Operand," all incorporated herein by reference.

As shown in this application and other applications incorporated herein by reference, the implementation described above provides a one-dimensional SIMD array of processing units. Each processing unit can perform operations for one or more full height columns of pixels from an image. If the value of each pixel is indicated by more than one bit, the pixel values are stored horizontally rather than vertically, eliminating the need for corner turning operations between the host and the parallel processor.

The general implementation features described above may also be useful in various other applications, such as searching an image database for images containing a particular set of features; scanning envelopes for addresses; interpreting forms from a high-speed scanner; machine vision; and process-specific print image correction and verification.

E. Specific Implementation Features

Figure 8:
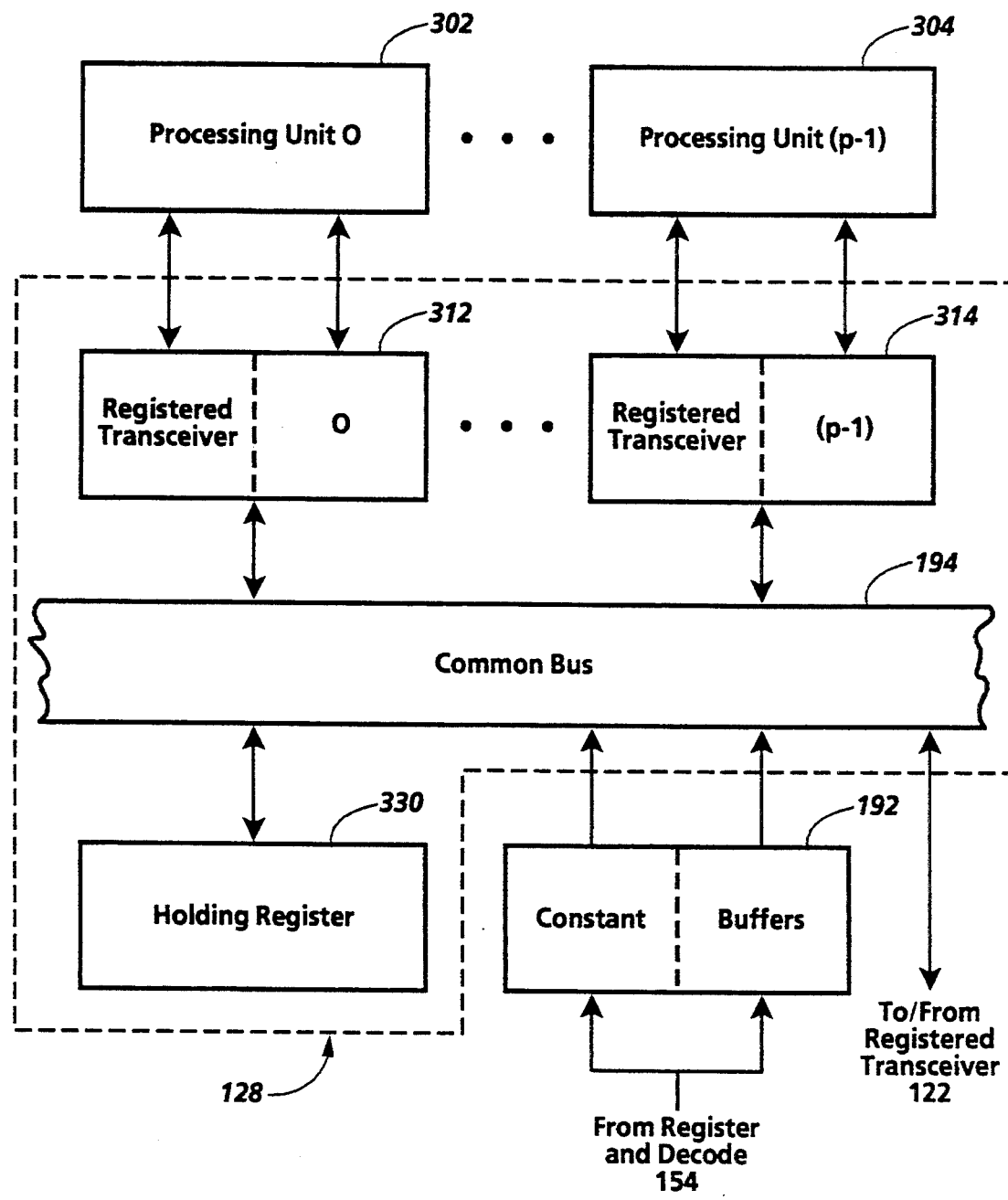
FIG. 8 is a schematic block diagram showing components of interconnecting circuitry in FIG. 3.
Figure 9:
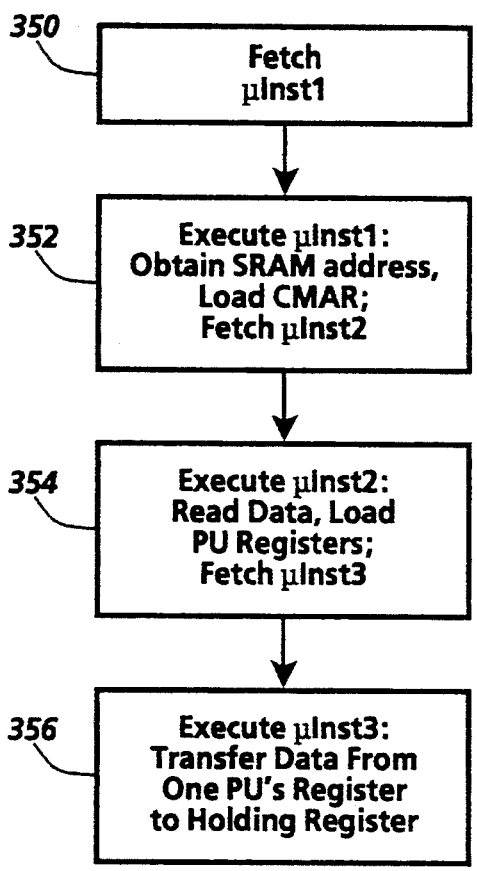
FIG. 9 is a flow chart showing clock cycles that transfer data from an SRAM as in FIG. 5 to a holding register as in FIG. 8.
Figure 10:
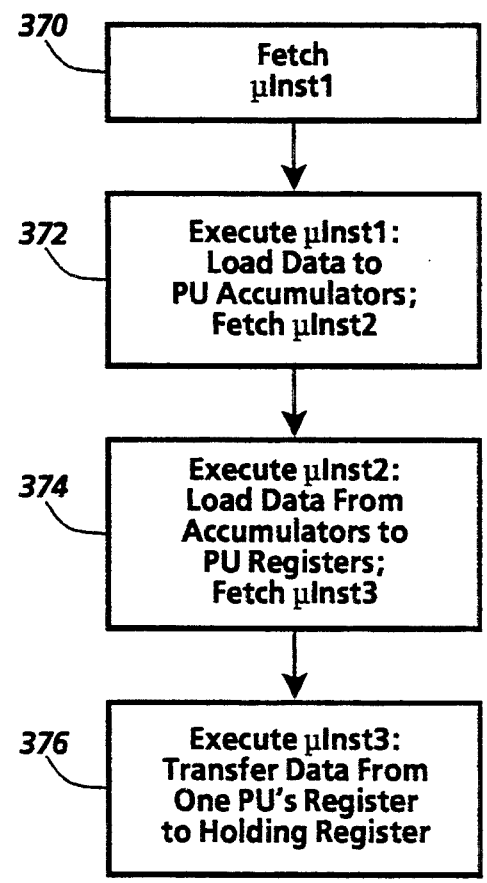
FIG. 10 is a flow chart showing clock cycles that transfer data from a register in a microprocessor as in FIG. 5 to a holding register as in FIG. 8.
Figure 11:
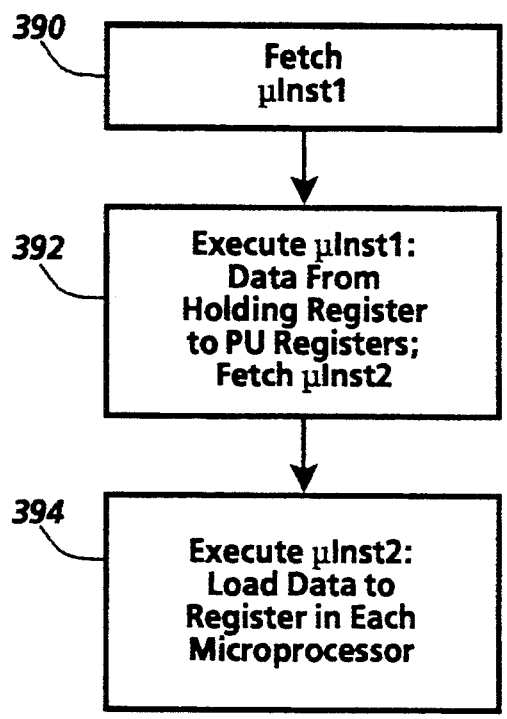
FIG. 11 is a flow chart showing clock cycles that transfer data from a holding register as in FIG. 8 to registers in microprocessors as in FIG. 5.
Figure 12:
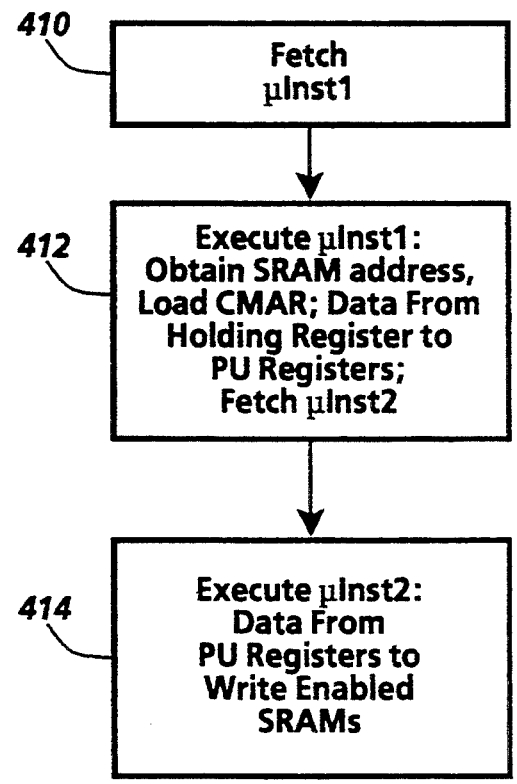
FIG. 12 is a flow chart showing clock cycles that transfer data from a holding register as in FIG. 8 to SRAM as in FIG. 5.
Figure 13:
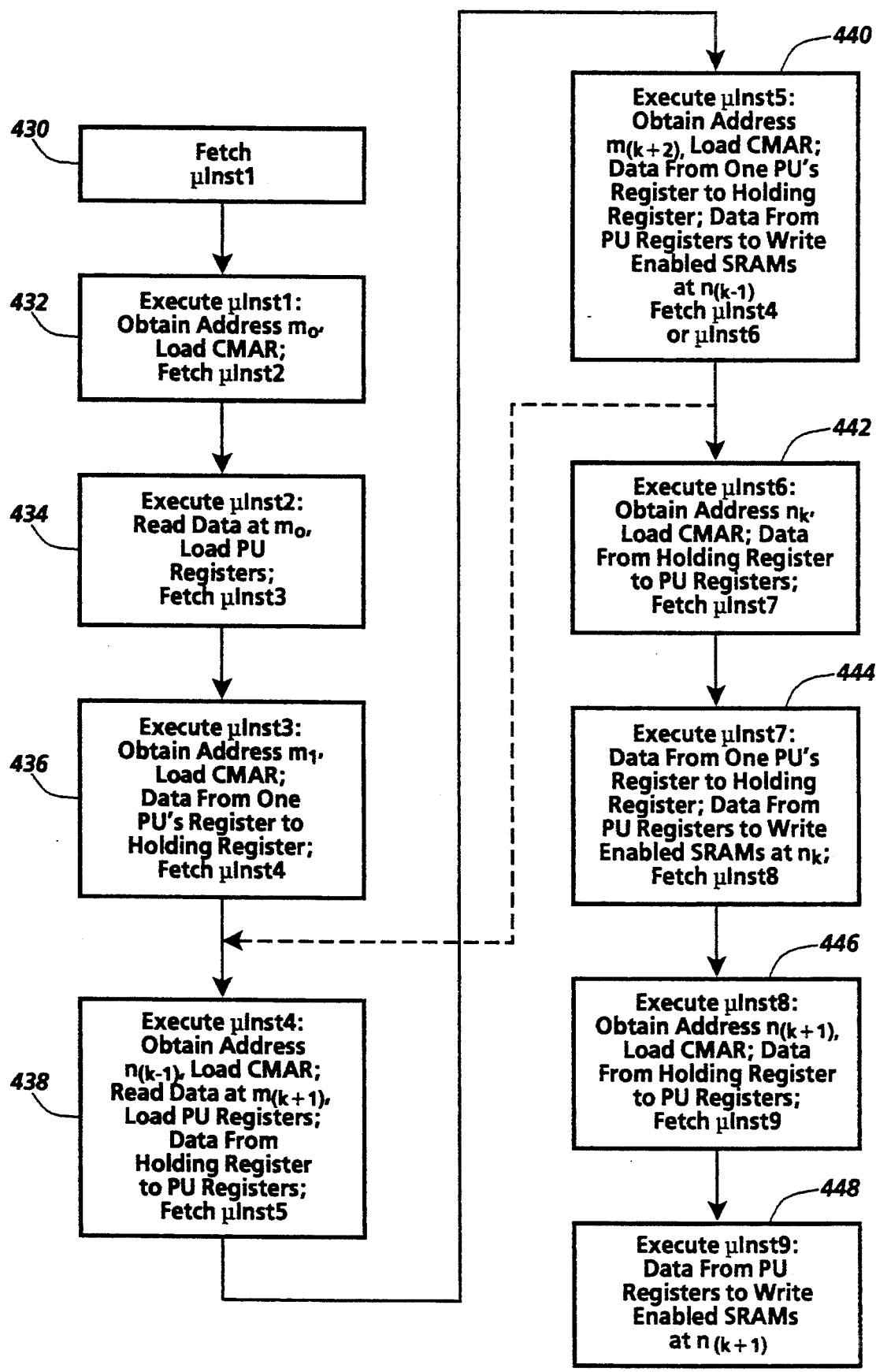
FIG. 13 is a flow chart showing clock cycles that transfer data in a pipelined manner from SRAM to SRAM using a holding register as in FIG. 8.

FIGS. 8–13 show how the general implementation features described above could be used to implement the invention. FIG. 8 is a schematic block diagram showing components of interconnecting circuitry 128 in FIG. 3 that participate in transfers of data to and from processing units. FIG. 9 shows clock cycles that transfer data from SRAM to a holding register. FIG. 10 shows clock cycles that transfer data from a register in a microprocessor to a holding register. FIG. 11 shows clock cycles that transfer data from a holding register to microprocessor registers. FIG. 12 shows clock cycles that transfer data from a holding register to SRAM. FIG. 13 shows clock cycles in a pipelined transfer of data from SRAM to SRAM.

FIG. 8 shows p processing units, from processing unit 302 through processing unit 304. Interconnecting circuitry 128 includes a registered transceiver for each processing unit, from registered transceiver 312 to registered transceiver 314. The processing units and the respective registered transceivers can be implemented as described above in relation to FIG. 5.

Each processing unit's respective registered transceiver is connected to common bus 194. Bus 194 can be implemented with conventional 32 bit bus circuitry, and register and decode 154 can provide signals to control data transfer on common bus 194 as described below.

Register and decode 154 can select any of several sources for common bus 194.

The sources for common bus 194 include registered transceivers 312 through 314, holding register 330, and register and decode 154 through constant buffers 192. Common bus 194 can receive from registered transceivers 312 through 314 through even and odd buses and transceivers, as described in the Reduction/Enlargement application. In addition, common bus 194 can receive from reduction circuitry as described in the Reduction/Enlargement application and from rotation circuitry as described in the Rotation applications. Also, when the coprocessor is master of SBus 102, common bus 194 can receive from SBus register 188 through registered transceiver 122, as described in copending coassigned U.S. patent application Ser. No. 07/993,256, entitled "SIMD Architecture for Connection to Host Processor's Bus" ("the Bus Master application"), incorporated herein by reference.

Holding register 330 can be used to store data from common bus 194 during one cycle and then to provide the stored data to common bus 194 for transmission to another component during a subsequent cycle. Holding register 330 could be implemented with a conventional 32 bit register. As described in the Tiling application, however, holding register 330 can also be implemented in a way that facilitates tiling. As described in the Rotation applications, the connections between holding register 330 and common bus 194 can be implemented in a way that facilitates rotation.

Constant buffers 192 can include two conventional 16 bit buffers. Register and decode 154 can obtain a 32 bit constant in two instructions. In other words, one instruction can include 16 high order bits, and register and decode 154 signals the high order constant buffer to provide the high order bits to common bus 194; another instruction can include 16 low order bits, and register and decode 154 signals the low order constant buffer to provide the low order bits to common bus 194. When 16 high or low order bits are being provided, the other 16 bits on common bus 194 can be pulled to zero by conventional circuitry. Alternatively, constant buffers 192 can include other buffer arrangements, connected to receive a constant of any appropriate width from one or more microinstructions fields of any appropriate width in relation to the constant's width; a 32 bit constant could be loaded, for example, from fields of 4, 8, 16, or 32 bits.

FIGS. 9–13 show sequences of microinstructions that can operate the components of FIGS. 4, 5, and 8 to perform several data transfers. Each box in FIGS. 9–13 represents acts performed during a single clock cycle. In general, the acts that can be completed in a single clock cycle determine which sequences of microinstructions can be executed. For example, an address for SRAM 240 must be calculated in the clock cycle before it is used, so that the microinstruction specifying the calculation must be fetched from control store 150 two clock cycles before the address is used.

The pipeline stages for timing calculations can be determined based on which components include a pipeline delay. Signals advance through a pipeline delay only on a rising clock edge. In general, there are no pipeline delays in the control lines from register and decode 154 to other components.

Each of the following components includes a pipeline delay: registered transceiver 122; MAR 152; register and decode 154; μPC 166; CMAR 172; registers 174; registered transceiver 186; SBus register 188; internal registers of microprocessors 220 and 222; accumulators 230 and 232; registered transceivers 312 through 314; and holding register 330. For example, data can be loaded into holding register 330 in a first clock cycle; transferred from holding register 330 to one of registered transceivers 312 through 314 in a second clock cycle; and transferred from one of registered transceivers 312 through 314 to a register in a microprocessor in the respective processing unit in a third clock cycle. Similarly, two clock cycles are required for data from control store 150 to reach SBus 102 through registered transceiver 186 and SBus register 188.

As described above, each microinstruction includes fields specifying address calculation, sequencer operations, and processing unit operations in parallel. Therefore, acts in addition to those shown in FIGS. 9–13 could be performed during the same clock cycles in response to appropriate microinstructions. In general, for example, each microinstruction could also specify an operation of sequencer 160 that loads the address of the next microinstruction to be fetched into MAR 152.

Clock cycle 350 in FIG. 9 includes an act that begins a transfer of data from SRAM 240 to holding register 330 by fetching a first microinstruction ($\mu$Inst1). $\mu$Inst1 includes an address processor instruction that includes an address processor opcode and an address processor register specifier. The instruction, when executed by address processor 170, produces an address in SRAM 240 that is loaded into CMAR 172.

Clock cycle 352 includes an act that executes $\mu$Iinst1, providing the address processor instruction to address processor 170 and providing signals so that the address produced by address processor 170 is loaded into CMAR 172. Address processor 170 also executes the address processor instruction during clock cycle 352. Clock cycle 352 also includes an act that fetches a second microinstruction ($\mu$Inst2) whose address was loaded into MAR 152 during clock cycle 350. $\mu$Inst2 specifies operations that load a data unit from an addressed location in SRAM 240 for each processing unit into its registered transceiver 212 by specifying that SRAM 240 is a source for buses 242 and 244. $\mu$Inst2 need not specify that registered transceiver 212 should perform a load operation, because registered transceiver 212 performs a load operation from buses 242 and 244 during every clock cycle that executes a microinstruction that specifies SRAM 240 as a source for buses 242 and 244. More generally, registered transceiver 212 could perform a load operation from buses 242 and 244 during every clock cycle, regardless of the source for buses 242 and 244.

During clock cycle 354, the address loaded into CMAR 172 in clock cycle 352 arrives at SRAM 240. Clock cycle 354 includes an act that executes $\mu$Inst2, providing signals that read enable each processing unit's SRAM 240 so that data units are read from the addressed location and transferred through buses 242 and 244. This act also provides signals that load the data units into each processing unit's registered transceiver 212, referred to in FIGS. 9–14 as "PU Registers." Clock cycle 354 also includes an act that fetches a third microinstruction ($\mu$Inst3) whose address was loaded into MAR 152 during clock cycle 352. $\mu$Inst3 specifies operations that load data units from one of registered transceivers 312 through 314 into holding register 330, by specifying the registered transceiver of one of processing units 302 through 304 as a source for data on common bus 194, and by specifying that holding register 330 should perform a load operation.

Clock cycle 356 includes an act that executes $\mu$Inst3, providing signals that select one of registered transceivers 312 through 314 as a source and that store data from common bus 194 in holding register 330. This clock cycle therefore completes a sequence of microinstructions that transfer data units to holding register 330.

Clock cycle 370 in FIG. 10 includes an act that begins a transfer of data units from microprocessor registers in one of processing units 302 through 304 to holding register 330 by fetching a first microinstruction ($\mu$Inst1). $\mu$Inst1 includes a microprocessor instruction that includes a microprocessor opcode and a microprocessor register specifier. The instruction, when executed by each microprocessor in processing units 302 through 304, causes each microprocessor to transfer a data unit from the specified register to its accumulator, which always stores the data unit present at the microprocessor's output at the end of every clock cycle.

Clock cycle 372 includes an act that executes $\mu$Inst1, providing the microprocessor instruction to each microprocessor in processing units 302 through 304. Each microprocessor also executes the instruction during clock cycle 372, transferring a data unit from the specified register to its accumulator. Clock cycle 372 also includes an act that fetches a second microinstruction ($\mu$Inst2) whose address was loaded into MAR 152 during clock cycle 370. $\mu$Inst2 specifies operations that load data units from the accumulators 230 and 232 in each processing unit into the processing unit's registered transceiver 212, by specifying that accumulators 230 and 232 are sources for buses 242 and 244. $\mu$Inst2 need not specify that registered transceiver 212 should perform a load operation, because registered transceiver 212 performs a load operation from buses 242 and 244 during every clock cycle that executes a microinstruction that specifies accumulators 230 and 232 as sources for buses 242 and 244.

Clock cycle 374 includes an act that executes $\mu$Inst2, providing signals to accumulators 230 and 232 in each processing unit to drive buses 242 and 244 and providing signals to each processing unit's registered transceiver 212 so that data units from accumulators 230 and 232 are loaded into each processing unit's registered transceiver 212. Clock cycle 374 also includes an act that fetches a third microinstruction ($\mu$Inst3) whose address was loaded into MAR 152 during clock cycle 372. $\mu$Inst3 specifies operations that load data from one of registered transceivers 312 through 314 into holding register 330, like the microinstruction fetched during clock cycle 354 in FIG. 9, described above.

Clock cycle 376 includes substantially the same act as clock cycle 356 in FIG. 9, described above. Clock cycle 376 therefore completes a sequence of microinstructions that transfer data to holding register 330.

Clock cycle 390 in FIG. 11 includes an act that begins a transfer of data from holding register 330 to each processing unit's microprocessors by fetching a first microinstruction ($\mu$Inst1). Iinst1 specifies a transfer of data from holding register 330 to each of registered transceivers 312 through 314 by specifying holding register 330 as a source for common bus 194. $\mu$Inst1 need not specify that registered transceivers 312 through 314 should perform a load operation, because each of registered transceivers 312 through 314 performs a load operation during every clock cycle that executes microinstruction that specifies holding register 330 as a source.

Clock cycle 392 includes an act that executes $\mu$Inst1, providing signals so that holding register 330 drives common bus 194 and registered transceivers 312 through 314 load data. Clock cycle 392 also includes an act that fetches a second microinstruction ($\mu$Inst2) whose address was loaded into MAR 152 during clock cycle 390. $\mu$Inst2 includes a microprocessor instruction that includes a microprocessor opcode and a microprocessor register specifier. The instruction, when executed by each microprocessor in processing units 302 through 304, causes each microprocessor to load data from bus 242 or bus 244 into the specified register.

Clock cycle 394 includes an act that executes μInst2, providing signals so that each processing unit's registered transceiver 212 drives buses 242 and 244 and providing the microprocessor instruction to each microprocessor in processing units 302 through 304. Each microprocessor also executes the instruction during clock cycle 394, loading data from bus 242 or bus 244 into the specified register. This clock cycle therefore completes a sequence of microinstructions that transfer data units from holding register 330 to a register in each microprocessor in all of processing units 302 through 304.

FIG. 12 illustrates a similar technique to transfer data from holding register 330 to one or all of processing units 302 through 304. Clock cycle 410 in FIG. 12 includes an act that begins a transfer of data from holding register 330 to SRAM 240 of one or all processing units by fetching a first microinstruction (μInst1). μInst1 includes an address processor instruction that includes an address processor opcode and an address processor register specifier. The instruction, when executed by address processor 170, produces an address in SRAM 240 that is loaded into CMAR 172. μInst1 also specifies a transfer of data from holding register 330 to each of registered transceivers 312 through 314 by specifying holding register 330 as a source for common bus 194.

Clock cycle 412 includes an act that executes μInst1, providing the address processor instruction to address processor 170 and providing signals so that the address produced by address processor 170 is loaded into CMAR 172. Address processor 170 also executes the address processor instruction during clock cycle 412. The act that executes μInst1 also provides signals so that holding register 330 drives common bus 194 and registered transceivers 312 through 314 load data. Clock cycle 412 also includes an act that fetches a second microinstruction (μInst2) whose address was loaded into MAR 152 during clock cycle 410. μInst2 specifies registered transceiver 212 as a source for buses 242 and 244 in each processing unit and also specifies in which processing units SRAM 240 should be written.

Clock cycle 414 includes an act that executes μInst2, providing signals so that each processing unit's registered transceiver 212 drives buses 242 and 244 and providing write enable signals to the specified SRAMs. For example, both the upper and lower half of all SRAMs could be write enabled, or any single SRAM could be write enabled, for its upper half, its lower half, or both halves. As a result, data from registered transceiver 212 is written as specified. This clock cycle therefore completes a sequence of microinstructions that transfer data units from holding register 330 to one or all of processing units 302 through 304.

Register and decode 154 could instead be implemented to permit other write enable selections. For example, a subset of the SRAMs could be write enabled by μInst2. More generally, a sequence of microinstructions like μInst2 could be executed, each with a different specified SRAM, to write an arbitrary subset of SRAMs.

Acts resembling those in FIGS. 11 and 12 could be performed to transfer data through constant buffers 192 to processing units. Clock cycles 392 and 412 could include, rather than an act transferring data from holding register 330 to registered transceivers 312 through 314, an act transferring data from register and decode 154 through constant buffers 192 to registered transceivers 312 through 314. In each case, μInst1 could specify constant buffers 192 as a source for common bus 194. If μInst1 only includes a 16 bit constant, two iterations could be performed to provide one 16 bit constant on bus 242 and another on bus 244; in some cases, the same 16 bit constant could be provided in a single iteration on both buses 242 and 244, such as by copying the constant into both the upper and lower parts of constant buffers 192.

FIG. 13 illustrates a pipelined transfer of data using holding register 330. Clock cycle 430 in FIG. 13 includes an act that begins a pipelined transfer of data from between SRAMs by fetching a first microinstruction (μInst1). μInst1 includes an address processor instruction that includes an address processor opcode and an address processor register specifier. The instruction, when executed by address processor 170, produces an address $m_0$ that is loaded into CMAR 172.

Clock cycle 432 includes an act that executes μInst1, providing the address processor instruction to address processor 170 and providing signals so that address $m_0$ is loaded into CMAR 172. Address processor 170 also executes the address processor instruction during clock cycle 432. Clock cycle 432 also includes an act that fetches a second microinstruction (μInst2) whose address was loaded into MAR 152 during clock cycle 430. μInst2 specifies operations that load a data unit from an addressed location in SRAM 240 for each processing unit into its registered transceiver 212, by specifying that SRAM 240 is a source for buses 242 and 244.

During clock cycle 434, address $m_0$ from CMAR 172 arrives at each processing unit's SRAM 240. Clock cycle 434 includes an act that executes μInst2, providing signals that read enable each processing unit's SRAM 240 so that data units are read from the location at address $m_0$ and transferred through buses 242 and 244. This act also provides signals that load the data units into each processing unit's registered transceiver 212. Clock cycle 434 also includes an act that fetches a third microinstruction (μInst3) whose address was loaded into MAR 152 during clock cycle 432.

Like μInst1, μInst3 includes an address processor instruction that produces an address $m_1$ that is loaded into CMAR 172. μInst3 also specifies operations that load data units from one of registered transceivers 312 through 314 into holding register 330, by specifying the register of one of processing units 302 through 304 as a source for data and by specifying that holding register 330 should perform a load operation.

Clock cycle 436 includes an act that executes μInst3, providing the address processor instruction to address processor 170 and providing signals so that address ml is loaded into CMAR 172 after address processor 170 executes the address processor instruction. The act of executing μInst3 also provides signals that select one of registered transceivers 312 through 314 as a source and that store data from common bus 194 in holding register 330. Clock cycle 436 also includes an act that fetches a fourth microinstruction (μInst4) whose address was loaded into MAR 152 during clock cycle 434.

Like μInst2, μInst4 specifies operations that load a data unit from an addressed location in SRAM 240 for each processing unit into its registered transceiver 212, by specifying that SRAM 240 is a source for buses 242 and 244. μInst4 also includes an address processor instruction that produces an address $n_0$ that is loaded into CMAR 172. μInst4 also specifies a transfer of data from holding register 330 to each of registered transceivers 312 through 314 by specifying holding register 330 as a source for common bus 194.

The acts in clock cycles 430, 432, 434, and 436 set up a pipeline that can then be used by iterating the acts in clock cycles 438 and 440. Clock cycles 438 and 440 may be repeated K times, with each iteration being designated as the kth iteration.

Clock cycle 438 includes an act that executes μInst4, providing the address processor instruction to address processor 170 and providing signals so that address $n_{(k-1)}$ is loaded into CMAR 172 after address processor 170 executes the address processor instruction. The act that executes μInst4 also provides signals so that holding register 330 drives common bus 194 and registered transceivers 312 through 314 load data. Like the act in clock cycle 434, the act in clock cycle 438 provides signals that read enable each processing unit's SRAM 240 so that data units are read from the location at address $m_{(k+1)}$ and transferred through buses 242 and 244. This act also provides signals that load the data units into each processing unit's registered transceiver 212. Clock cycle 438 also includes an act that fetches a fifth microinstruction (μInst5) whose address was loaded into MAR 152 during clock cycle 436 or, after the first iteration, during clock cycle 440 of the previous iteration.

Like μInst3, μInst5 includes an address processor instruction that produces an address $m_{(k+1)}$ that is loaded into CMAR 172. μInst5 also specifies operations that load data units from one of registered transceivers 312 through 314 into holding register 330, by specifying the registered transceiver of one of processing units 302 through 304 as a source for data and by specifying that holding register 330 should perform a load operation. μInst5 also specifies registered transceiver 212 as a source for buses 242 and 244 in each processing unit and also specifies in which processing units SRAM 240 should be written.

Clock cycle 440 includes an act that executes μInst5, providing the address processor instruction to address processor 170 and providing signals so that address $m_{(k+1)}$ is loaded into CMAR 172 after address processor 170 executes the address processor instruction. The act of executing μInst5 also provides signals that select one of registered transceivers 312 through 314 as a source and that store data from common bus 194 in holding register 330. The act of executing μInst5 also provides signals so that each processing unit's registered transceiver 212 drives buses 242 and 244 and provides write enable signals to the specified SRAMs. For example, both the upper and lower half of all SRAMs could be write enabled, or any single SRAM could be write enabled, for its upper half, its lower half, or both halves. As a result, data from registered transceiver 212 is written as specified. Clock cycle 440 also includes an act that either fetches μInst4 for the next iteration or that fetches a sixth microinstruction (μInst6), in either case using an address that was loaded into MAR 152 during clock cycle 438 of the current iteration.

Like μInst4, μInst6 includes an address processor instruction that produces an address $n_K$ that is loaded into CMAR 172. μInst6 also specifies a transfer of data from holding register 330 to each of registered transceivers 312 through 314 by specifying holding register 330 as a source for common bus 194.

The acts in clock cycles 442, 444, 446, and 448 then finish handling the pipeline of data resulting from the preceding steps, but without reading further data from the SRAMs.

Clock cycle 442 includes an act that executes μInst6, providing the address processor instruction to address processor 170 and providing signals so that address $n_K$ is loaded into CMAR 172 after address processor 170 executes the address processor instruction. The act that executes μInst6 also provides signals so that holding register 330 drives common bus 194 and registered transceivers 312 through 314 load data. Clock cycle 442 also includes an act that fetches a seventh microinstruction (μInst7) whose address was loaded into MAR 152 during the Kth iteration of clock cycle 440.

Like μInst5, μInst7 specifies operations that load data units from one of registered transceivers 312 through 314 into holding register 330, by specifying the registered transceiver of one of processing units 302 through 304 as a source and by specifying that holding register 330 should perform a load operation. μInst7 also specifies registered transceiver 212 as a source for buses 242 and 244 in each processing unit and also specifies in which processing units SRAM 240 should be written.

Clock cycle 444 includes an act that executes μInst7, providing signals that select one of registered transceivers 312 through 314 as a source and that store data from common bus 194 in holding register 330. The act of executing μInst7 also provides signals so that each processing unit's registered transceiver 212 drives buses 242 and 244 and provides write enable signals to the specified SRAMs. As a result, data from registered transceiver 212 is written as specified. Clock cycle 444 also includes an act that fetches an eighth microinstruction (μInst8), using an address that was loaded into MAR 152 during clock cycle 442.

Like μInst6, μInst8 includes an address processor instruction that produces an address $n_{(K+1)}$ that is loaded into CMAR 172. μInst8 also specifies a transfer of data from holding register 330 to each of registered transceivers 312 through 314 by specifying holding register 330 as a source for common bus 194.

Clock cycle 446 includes an act that executes μInst8, providing the address processor instruction to address processor 170 and providing signals so that address $n_{(K+1)}$ is loaded into CMAR 172 after address processor 170 executes the address processor instruction. The act that executes μInst8 also provides signals so that holding register 330 drives common bus 194 and registered transceivers 312 through 314 load data from even and odd buses 320 and 322. Clock cycle 446 also includes an act that fetches a ninth microinstruction (μInst9) whose address was loaded into MAR 152 during clock cycle 444. Like μInst7, μInst9 specifies registered transceiver 212 as a source for buses 242 and 244 in each processing unit and also specifies in which processing units SRAM 240 should be written.

Clock cycle 448 includes an act that executes μInst9, providing signals so that each processing unit's registered transceiver 212 drives buses 242 and 244 and provides write enable signals to the specified SRAMs. As a result, data from registered transceiver 212 is written as specified. This completes the pipelined transfer of data.

Implementations similar to those described above are described in the Reduction/Enlargement application, the Rotation applications, and the Tiling application. The Reduction/Enlargement application describes components that perform reduction and enlargement operations during a transfer of data to and from a holding register. The Rotation applications describe components providing additional data paths between processing units and a bus and between a holding register and a bus. The Tiling application describes a component like a holding register that can also function as a shift register during a tiling operation.

Closely related implementations are described in co-pending coassigned U.S. patent application Ser. No. 07/993,256, entitled "SIMD Architecture for Connection to Host Processor's Bus" ("the Bus Master application"), incorporated herein by reference. The Bus Master application describes transfers of data to and from an SBus.

F. Specific Applications

The invention could be applied in many ways, including image processing of the type described in U.S. Pat. Nos. 5,065,437; 5,048,109; 5,129,014; and 5,131,049. Such image processing techniques use data defining a first image to obtain a second image through operations such as erosion and dilation, operations that are defined in the Serra books cited above. Such operations can, for example, be performed by a series of suboperations each of which shifts an original image to obtain a shifted image and then performs a Boolean operation with values from the original image and the shifted image at each location. Some parts of the shifting operation can be performed with data transfers implemented as described above.

The invention could also be applied to perform various other operations, such as pixel counting, gray scale morphology, skew detection, and Boolean operations on images.

G. Miscellaneous

The invention has been described in relation to an implementation with a SPARCStation as a host processor, but the invention could be implemented with any other suitable host processor. More specifically, the invention has been described in relation to a specific clocking scheme and pipelining circuitry appropriate to an SBus, but other clocking schemes and pipelining circuitry could be used as appropriate to other host buses. In addition to the burst transfers described above, concurrent burst transfers in both directions might be implemented with additional pipeline circuitry. Or it might be possible in some implementations for slave and master circuitry to share some components of pipeline circuitry.

The invention has been described in relation to an implementation in which items of data are transferred in and out of the processing units in horizontal format and operations are performed on items of data in horizontal format. Although this is not necessary and may not be advantageous, the invention might be implemented in a machine that includes corner turning circuitry so that operations can be performed in vertical format and items of data can be stored in vertical format in processing unit memory. Further, the invention might be implemented in a machine in which data can be shifted in and out of a processing unit array. Also, the invention might be implemented with additional circuitry for operating on data relating to an image as it is received from the host bus, such as by subsampling to reduce an image, thereby reducing the amount of data that must be stored in the processing units; this technique would be especially useful in operating on data relating to an image where the data in its original form is larger than the combined memory of the processing units. The invention might also be implemented with circuitry to reorder pixel values or bits within pixel values during a transfer from the host to the coprocessor or from the coprocessor to the host if the representation of data in the the host and coprocessor do not match each other.

The invention has been described in relation to implementations with conventional microprocessors, but the invention might also be implemented with reduced instruction set/RISC) chips. Such RISC chips do not conventionally have shift inputs and outputs, so that shared memory might be necessary to perform shifting operations between processing units.

The invention has been described in relation to implementations in which processing units are connected into a one-dimensional array. The invention might also be implemented with a parallel processor in which the processing units are connected into a two- or three-dimensional array or into any other suitable arrangement.

The invention has been described in relation to implementations in which bits remain uninverted while being transferred between components in a parallel processor. The invention might also be implemented with inversions during data transfer to increase performance, such as an inversion when an item of data is loaded into a holding register and another inversion when the item of data is read out of the holding register.

The invention has been described in relation to an implementation that includes a SIMD parallel processor in which coprocessor control circuitry has two control lines to each processing unit, one to select a register as a source of data on a common bus and the other to write enable the processing unit's memory. The invention might be implemented with other types of parallel processors. For example, the invention could be implemented with additional lines to each processing unit, such as separate instruction and address lines so that each processing unit could operate independently of other processing units. In addition, special write enable lines could be provided to write independently in the memories of different processing units or independently in the memory of a specific microprocessor in each processing unit.

The invention has been described in relation to implementations in which control circuitry provides addresses in parallel to processing units. The invention might also be implemented with a parallel processor in which processing units independently obtain addresses, such as from a local address processor or from an address processor that serves a subset of processing units.

The invention has been described in relation to implementations in which processing units include single port memory circuitry. The invention might also be implemented with dual port memory circuitry.

The invention has been described in relation to implementations in which a 32 bit bus interconnects 32 bit registers and in which each processing unit includes two 16 bit microprocessors and a 32 bit SRAM. The invention might also be implemented in numerous other ways with components having different widths. For example, each processing unit might include a 16 bit SRAM for each microprocessor or each processing unit might include a single 32 bit microprocessor. Alternatively, the bus might be a 16 bit or 64 bit bus, and other components could be chosen accordingly. Similarly, the control store, described as implemented with 128 bit microinstructions, might also be implemented with microinstructions of other lengths, such as 64 bit encoded microinstructions. Further the invention might be implemented with a dedicated control store chip.

The invention has been described in relation to implementations that operate on data relating to images, but might also be implemented to operate on data that do not relate to an image.

The invention has been described in relation to implementations that include readily available discrete components. The invention might also be implemented with custom VLSI components, and similarly with custom memory components.

The invention has been described in relation to implementations in which each processing unit includes SRAM, but the invention might also be implemented with other types of memory, such as dynamic RAM, flash RAM, and so forth.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a parallel processor that includes:

two or more processing units; each processing unit including memory circuitry for storing data; each processing unit's memory circuitry storing a respective set of items of data, each of which can be accessed when the memory circuitry receives a respective address from a set of addresses;

interconnecting circuitry for interconnecting the processing units; the interconnecting circuitry including:

bus circuitry;

for each processing unit, respective source/destination circuitry connected to the bus circuitry and the processing unit for providing items of data from the processing unit to the bus circuitry and for receiving items of data from the bus circuitry for the processing unit; the memory circuitry of each processing unit being connected to receive a data item from the processing unit's source/destination circuitry; and a transfer register connected to the bus circuitry for receiving items of data from the bus circuitry, for storing received items of data, and for providing stored items of data to the bus circuitry; the bus circuitry being capable of transferring an item of data received from the source/destination circuitry of each of the processing units to the transfer register and further being capable of transferring an item of data received from the transfer register to the source/destination circuitry of each of the processing units; and addressing circuitry connected for providing items of address data to the memory circuitry of each of the processing units in parallel; the items of address data indicating a series of addresses from the set of addresses;

the method comprising acts of:

providing an item of instruction data indicating a first instruction to the processing circuitry of all of the processing units in parallel; the processing circuitry of all of the processing units responding by executing the first instruction in parallel; each processing unit's processing circuitry, in executing the first instruction, providing an item of data to the processing unit's source/destination circuitry; the processing circuitry of a first one of the processing units providing a first item of data to the first processing unit's source/destination circuitry;

providing first transfer signals to the first processing unit's source/destination circuitry so that the first processing unit's source/destination circuitry provides the first item of data to the bus circuitry;

providing second transfer signals to the transfer register so that the transfer register receives the first item of data from the bus circuitry and stores the first item of data;

providing third transfer signals to the transfer register so that the transfer register provides the stored first item of data to the bus circuitry;

providing fourth transfer signals to the source/destination circuitry of each processing unit so that the source/destination circuitry of each processing unit receives the first item of data from the bus circuitry;

operating the addressing circuitry to provide an item of address data indicating an address to the memory circuitry of all of the processing units in parallel; and providing a write enable signal to the memory circuitry of a second one of the processing units; the memory circuitry of the second processing unit responding to the write enable signal by writing the first item of data from the second processing unit's source/destination circuitry at the address indicated by the item of address data provided by the addressing circuitry.

2. The method of claim 1 in which the source/destination circuitry of each processing unit includes a registered transceiver connected to receive a data item from the processing unit; the act of providing first transfer signals to the first processing unit's source/destination circuitry comprising:

providing a select signal to the first processing unit's registered transceiver; the registered transceiver responding to the select signal by providing the first data item to the bus circuitry.

* * * * *